Figure 9:
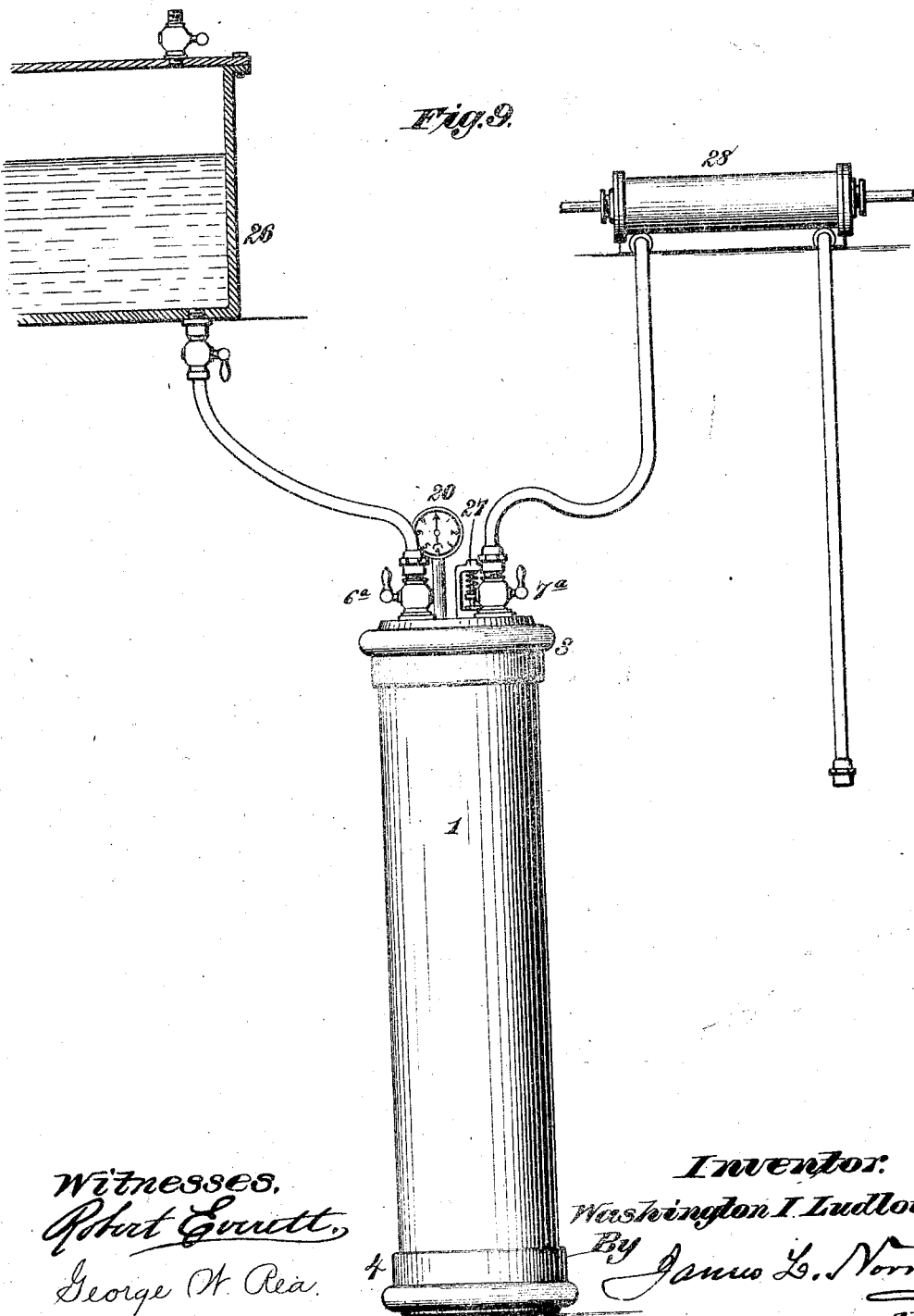

(No Model.) 2 Sheets—Sheet 1.
W. I. LUDLOW.
SECONDARY OR STORAGE BATTERY.
No. 362,640. Patented May 10, 1887.
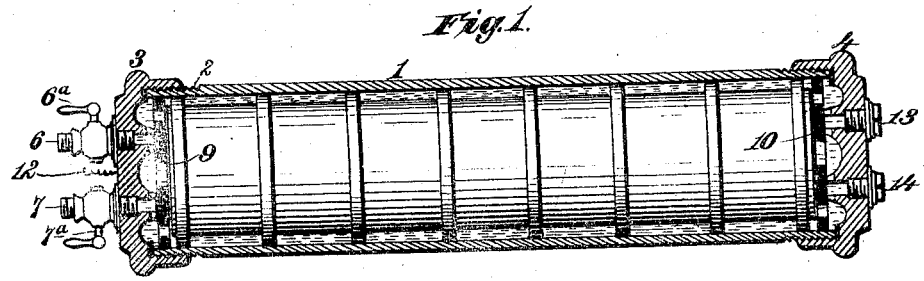
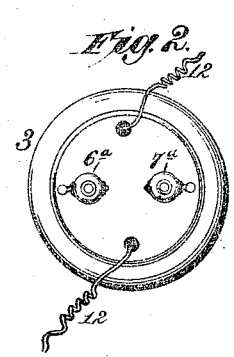
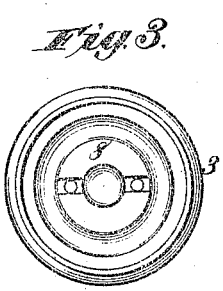
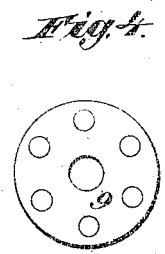
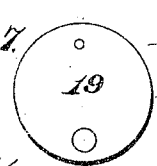
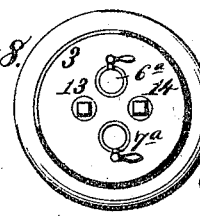
Witnesses.
Robert Burrett
George W. Rea
Inventor:
Washington I. Ludlow
By James L. Nor
Att.

(No Model.) 2 Sheets—Sheet 2.

W. I. LUDLOW.
SECONDARY OR STORAGE BATTERY.

No. 362,640. Patented May 10, 1887.

Witnesses,
Robert Everett,
George W. Rea.

Inventor:
Washington I. Ludlow.
By James L. Norris.
Atty.

UNITED STATES PATENT OFFICE.

WASHINGTON I. LUDLOW, OF CLEVELAND, OHIO.

SECONDARY OR STORAGE BATTERY.

SPECIFICATION forming part of Letters Patent No. 362,640, dated May 10, 1887.

Application filed November 29, 1886. Serial No. 220,175. (No model.)

*To all whom it may concern:*

Be it known that I, WASHINGTON I. LUDLOW, a citizen of the United States, residing at Cleveland, in the county of Cuyahoga and State of Ohio, have invented new and useful Improvements in Secondary or Storage Batteries, of which the following is a specification.

The present invention has for its object to provide a secondary or storage battery having great capacity for the storage of electricity within comparatively small compass; secondly, to provide a battery of such form and construction that it can be easily handled and conveniently transported without danger of disarrangement of its piles or elements, and without loss or waste of the electrolyte or exciting-fluids. Furthermore, it is the aim of the invention to provide a secondary or storage battery which can be more readily adapted to certain special uses wherein the elements of the battery or its normal action are not disturbed by jarring or other movements to which it may as a whole be subjected, and one that is so inclosed or protected as to be free from extraneous influences leading to interference with its proper functions.

The invention consists in the construction and arrangement of parts, which will be hereinafter more fully described, and then set forth in the claims.

In the accompanying drawings, Figure 1 is a longitudinal sectional view of one form of secondary battery embodying my invention. Fig. 2 is an outside view of one of the end caps of the battery-chamber. Fig. 3 is an inside view of the same. Fig. 4 is a detail view of a perforated disk for insulating the pile from the end heads. Fig. 5 is a cross-section of a pile formed of spirally-rolled sheets and insulating material. Fig. 6 is a face view, partly in section, of a secondary battery having its elements formed of superposed disks. Fig. 7 is a face view of one of the disk-shaped electrodes. Fig. 8 is an end view of Fig. 6. Fig. 9 is an elevation showing the battery electrolyte-reservoir and pressure apparatus.

The reference-numeral 1 designates a cylindrical shell, which is preferably made of considerable length, and is constructed of drawn metal lined on the inside with a material not affected by the electrolyte or exciting-fluid. The shell 1 may also be constructed of some non-porous or impervious vitreous material. The ends of the shell are open, and it has exterior screw-threads, 2, upon which are screwed flanged end heads or caps, 3 and 4. The shell or casing 1 incloses the elements or electrodes of a secondary battery, which, in the construction seen in Fig. 1, are made of spirally-rolled sheets of lead, and in Fig. 6 are made of superposed parallel disks. The end head 3 has two pipes, 6 and 7, screwed into the same, and it has a circular ridge, 8, on its under or inner side, which bears against a perforated disk, 9, of some insulating material, resting against the end of the pile or electrodes adjoining said end head. The end head 4 also has a circular ridge on its under side, again a which bears a perforated insulating disk, 10, resting against the end of the pile or the electrodes adjoining such end head. By such construction and arrangement the electrodes are firmly held between the end heads and are insulated from the latter. The disk 9 is perforated to permit the circulation of the electrolyte and the passage of the conducting-wires 12, extending from the electrodes, and said wires run through insulating-sleeves in the end head 3, and are sealed in the latter, so as to leave no air-opening at the point of passage.

The pipes 6 and 7 have suitable stop-cocks, $6^a$ and $7^a$, which, when closed, serve to hermetically seal the electrode-chamber. The end head 4 also has two openings, which are closed by screw-plugs 13 and 14. These plugs when withdrawn allow a pressure-gage, 20, and a safety-valve, 27, (shown in Fig. 9,) to be inserted in their places.

The elements of the pile made of spirally-rolled sheets of lead and separating sheets of insulating material are surrounded by bands, 16 of some insulating material, which serve to preserve the cylindrical form of the pile, and also hold the latter from contact with the cylindrical shell, the bands closely fitting said shell.

In the construction shown in Fig. 6 the shell, with its end heads and attachments, is the same as in Fig. 1. The pile, however, is made of disk-shaped elements, which fill the space between the end heads and are properly insulated. The mode of constructing such a pile is as follows, viz: Two rods, 17 and 18, constituting electrical conductors, extend the entire length of the cylindrical shell and project through the head 3, and have the couples comprising the pile slipped thereon. Each couple or pair of elements consists of two disks or circular plates, 19 and 20, which are separated from each other by an intermediate sheet of flannel, felt, or other material, 35. These couples are each held or inclosed between two disks or plates, 21, of perforated glass, india-rubber, or other insulating material, which closely fit the interior of the shell 1 and insulate the elements of the pile from the latter.

As seen in Figs. 6 and 7, the elements or electrodes have large and small openings 22 and 23, so that each rod will closely hug one electrode and make no contact with the other electrode. In this manner the respective rods are connected with the negative and positive electrodes, and the entire series of couples are connected or included in the same circuit. The rods 17 and 18 project through insulating-sleeves 40, fitted in the end head 3, and have screw-threads cut upon the ends projecting beyond said sleeves. These screw-threads receive nuts 41, which serve to fasten the rods to the head 3, and bear upon elastic washers 42, encircling the rods between the end head and said nuts. At a point near the interior circular rim of the head 3 the rods have collars 17ª 18ª, between which and the head are held india-rubber or elastic washers 45, so as to insure a tight joint, said washers being pressed into cavities in the head 3 by the collars 17ª and 18ª and nuts 41. The ends of the rods adjoining the head 4 have screw-threads and nuts 25, so as to clamp the elements and insulating-disks between said nuts and the collars 17ª 18ª and form a solid or firm body that can be conveniently handled. The ends of the rods 17 and 18 have sockets and clamps for securing the electrical conductors or wires 50.

I have in another application for patent filed November 13, 1886, Serial No. 218,802, set forth a method of "forming" and working secondary or storage batteries by causing a penetration of the electrolyte into the electrodes by a vacuum or pneumatic or hydraulic pressure. The batteries set forth in the present case are adapted for carrying out said method, and for the purposes of a description it is only necessary to add that the pipes 6ª and 7ª serve, respectively, for the attachment of a vacuum-producing pump or apparatus, 28, and connection with a reservoir, 26, containing the electrolyte, as is shown in Fig. 9. The apparatus 28 shown can be constructed to create a vacuum as well as pneumatic or hydrostatic pressure, as will be readily understood.

In forming the electrodes, a vacuum is created in the electrode-chamber, and then the electrolyte is admitted from the reservoir, so that it will penetrate the pores of the electrodes, and subsequently air-pressure is applied either by the pump which has produced the vacuum or by other well-known means, in order to exert a sufficient force upon the electrolyte during the process of "formation" of the electrodes. Provision is made, as has already been stated, for applying a pressure-gage and a relief or safety valve to the end head 4.

In Fig. 9 the devices are shown applied to the head 3, and it may be observed that the gage and valve are only required when a great or abnormal pressure is liable to occur in the electrode-chamber. In working or discharging the battery, whether it is "formed" or is prepared mechanically, the vacuum alone, the vacuum and subsequent air-pressure, or the air-pressure alone, or hydraulic pressure are resorted to for effecting a quick and thorough penetration of the electrolyte into the active coating of the electrodes.

The batteries shown by me are specially and peculiarly adapted for carrying out said method of working; but, obviously, certain features may be applied to secondary batteries working without pressure.

I have shown the cylinder provided with two detachable end heads; but I may rivet or secure one of said heads and only have one made detachable. Furthermore, the conducting-wires can be led out through the body of the cylinder or shell.

Having thus described my invention, what I claim is—

1. The combination, with a secondary battery comprising an open-ended shell or cylinder, detachable end heads, and interior elements or electrodes filling the space between the end heads, of means, substantially as described, for exerting pressure upon the electrolyte, said means being arranged outside the battery and detachably connected thereto, for the object herein stated.

2. A secondary or storage battery comprising an open-ended shell or cylinder, an end cap having tubes for the attachment of appliances for producing a vacuum or pressure and admitting the electrolyte, and leading-in wires connected with the interior electrodes, substantially as described.

3. A secondary or storage battery comprising an open-ended shell or cylinder having screw-threads, two detachable end caps provided with screw-threads and tubes having stop-cocks, and the electrodes or secondary pile filling the space within the open-ended shell between its end caps, substantially as described.

4. The combination, with a secondary battery comprising a hermetically-sealed shell or cylinder, a detachable end cap, interior electrodes, and conducting-wires passing through the end cap, of means, substantially as shown, for creating a vacuum within the electrode-chamber and exerting pressure upon the electrolyte after the discontinuance of the vacuum and admission of said electrolyte, substantially as described.

5. A secondary or storage battery consisting of a shell or cylinder, a series of disk-shaped elements, separating and insulating sheets or disks, conducting rods upon which said elements and insulating-disks are piled and secured, and a detachable end cap, substantially as described.

6. A secondary or storage battery consisting of a shell or cylinder, detachable end caps having tubes and openings, a pile of disk-shaped elements and separating disks or plates, and conducting-rods having screw-threads, end nuts, and collars, and projecting through one of the end heads, substantially as described.

In testimony whereof I affix my signature in presence of two witnesses.

W. I. LUDLOW.

Witnesses:
J. A. RUTHERFORD,
JOS. L. COOMBS.